United States Patent [19]

Nelson

[11] 4,029,460
[45] June 14, 1977

[54] FLAT FILM EXTRUSION NOZZLE

[75] Inventor: Seddon C. Nelson, Fredericksburg, Va.

[73] Assignee: FMC Corporation, Philadelphia, Pa.

[22] Filed: July 29, 1975

[21] Appl. No.: 600,175

[52] U.S. Cl. .............................. 425/466; 425/381
[51] Int. Cl.² ....................................... B29F 3/04
[58] Field of Search ............... 72/253; 264/176 R; 425/466, 381, 141, 133.5; 156/500, 501, 244

[56] References Cited

UNITED STATES PATENTS

| | | | |
|---|---|---|---|
| 2,712,155 | 7/1955 | Nelson | 425/466 |
| 2,963,741 | 12/1960 | Longstreth et al. | 425/466 |
| 3,162,896 | 12/1964 | Seubert | 425/466 |
| 3,255,488 | 6/1966 | Waldherr | 425/466 |
| 3,377,655 | 4/1968 | Kucharski et al. | 425/466 |
| 3,461,501 | 8/1969 | Stewart | 425/381 X |
| 3,761,553 | 9/1973 | Richardson | 425/141 X |

Primary Examiner—Francis S. Husar
Assistant Examiner—Mark Rosenbaum
Attorney, Agent, or Firm—Eugene G. Horsky

[57] ABSTRACT

A film extrusion apparatus or nozzle which includes a pair of oppositely disposed, spaced elongated blades which together define an extrusion orifice of generally uniform width. At least one of such blades is slotted to impart limited flexibility to an exposed terminal corner portion thereof which assists in defining an end of the extrusion orifice. Means are provided for selectively deflecting the exposed, flexible corner portion of the one blade to thereby vary the width of the extrusion orifice along the end thereof.

11 Claims, 5 Drawing Figures

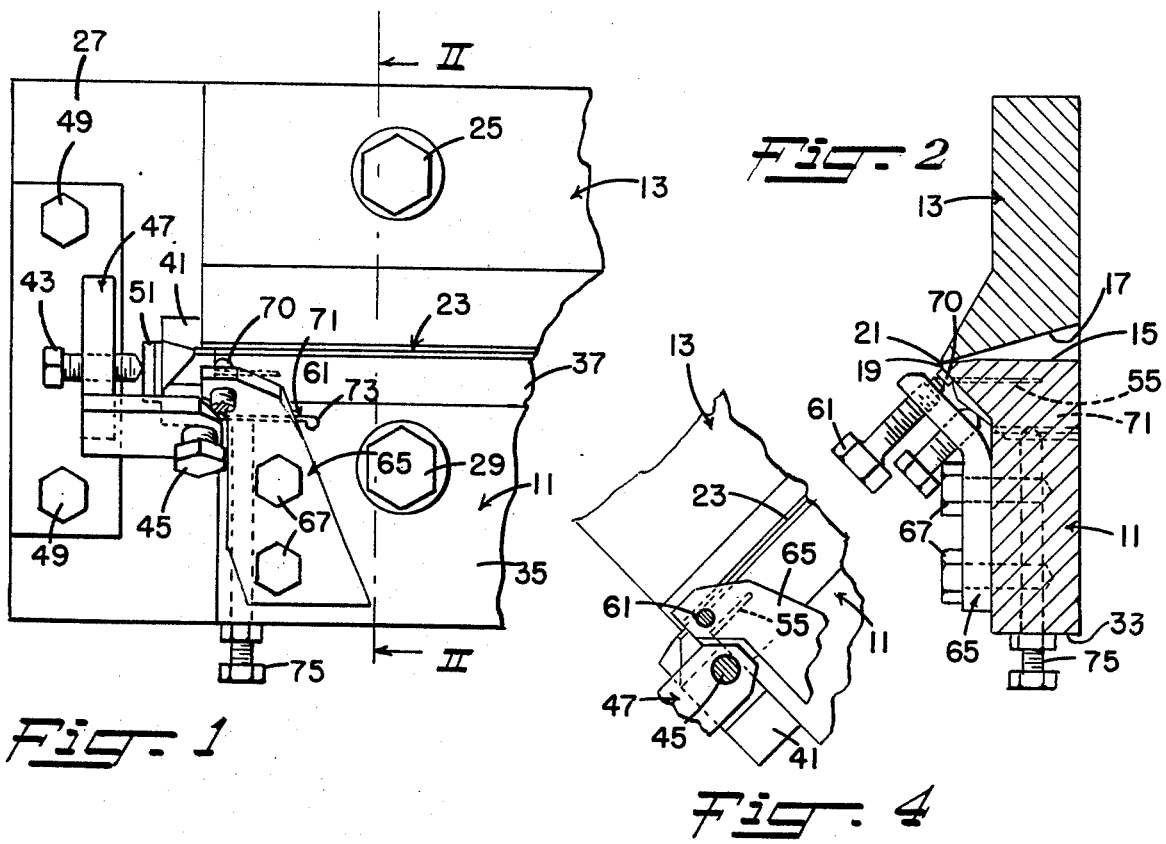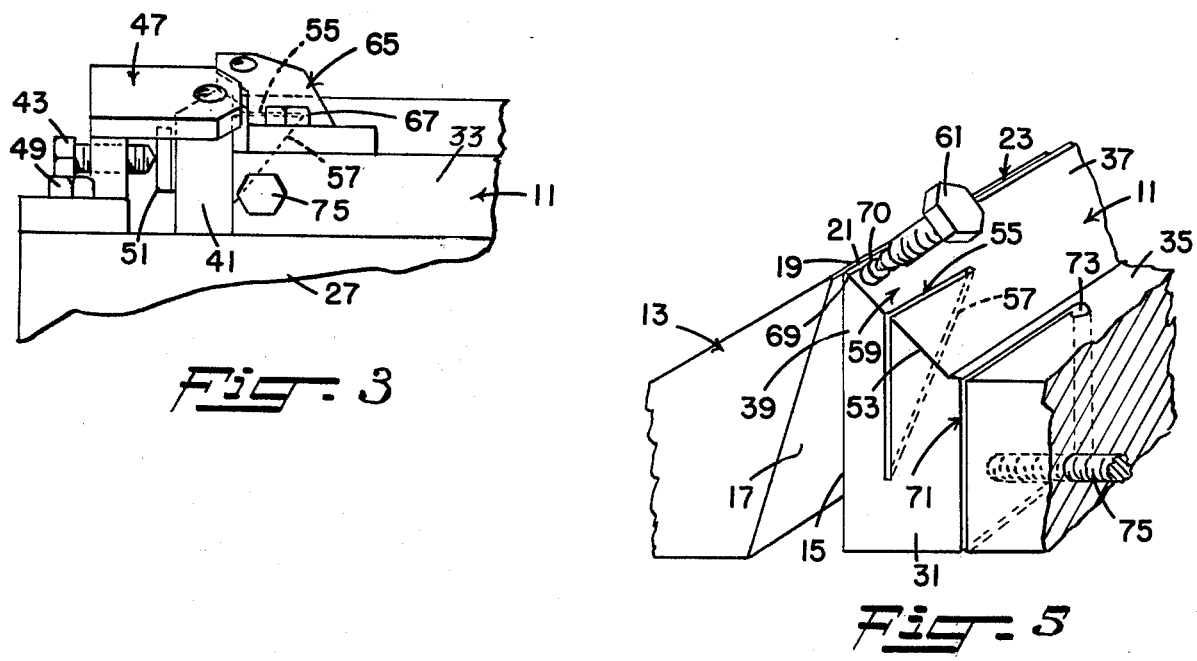

FLAT FILM EXTRUSION NOZZLE

The present invention is directed to an extrusion apparatus or nozzle for making a flat, thin, continuous film or sheet in which thickness variations across the width thereof, and more particularly, the presence of bead formations along the opposite longitudinal edges thereof, are at least minimized.

The consistent manufacture of extruded flat films having substantially uniform thickness dimensions across the widths thereof has been an objective of long-standing and has heretofore escaped satisfaction.

With films formed of coagulable solutions, such as regenerated cellulose films, U.S. Pat. Nos. 2,053,920; 2,712,155; 2,727,275; 2,727,276; and 2,923,971 are typical of the many proposals which have been urged for making films having improved gauge characteristics.

More particularly, U.S. Pat. No. 2,053,920 is concerned with minimizing film thickness variations by the use of an extrusion nozzle or hopper having a series of spaced internal devices which partially obstruct and thus control the rate of flow of a coagulable solution from the nozzle orifice.

The remaining of the cited United States patents are directed to extrusion nozzles in which portions of one of a pair of opposing elongated die blades or lips may be deflected in an attempt to conform the shape of the nozzle extrusion orifice to the cross-section desired in the resulting film. While the nozzles disclosed in these patents do facilitate the production of regenerated cellulose film having better gauge characteristics, there is still much room for improvement. For example, regenerated cellulose films made with the extrusion nozzle disclosed in U.S. Pat. No. 2,712,155 exhibit bead formations of a size almost one-half of that previously encountered. Yet, regardless of the size of such bead formations and other thickness variations, their presence makes uniform film winding and further processing difficult, and involves considerable waste, as for example, of raw and finished materials, energy and effort.

In the manufacture of flat films by the extrusion of molten thermoplastic materials, nozzles having independently controlled heaters at selected locations thereof have been employed for regulating the temperature of the molten thermoplastic material as it is extruded in an effort to minimize film thickness variations. However, precise and confined heat application by such system is difficult to achieve and thus accurate control over the flow rates of the melt along the length of the extrusion nozzles is lacking.

As taught by U.S. Pat. Nos. 2,982,995; 3,694,132; and 3,706,518, nozzles may be provided with specially shaped deckle rods which serve to control the width of the sheet of molten thermoplastic material which is extruded, as well as to meter the quantity of such material passing through the nozzle orifice adjacent to the effective outer edges thereof. Nozzles with such deckle rods have provided for some limited improvement in the uniformity of thermoplastic films but are not suited for use in the manufacture of films from coagulable solutions.

A primary object of this invention is to provide a generally new or improved and more satisfactory nozzle for making extruded, thin, flat films or sheets.

Another object is the provision of an improved extrusion apparatus for making flat films having little or no edge bead formation.

Still another object of this invention is the provision of an adjustable extrusion apparatus for use in making films having generally uniform thickness dimensions across the widths thereof.

A further object is the provision of an improved extrusion apparatus which is adapted for use in making flat films from coagulable solutions or thermoplastic polymeric materials and which is capable of being selectively adjusted to vary the width of the extrusion orifice at its end portions.

A still further object of this invention is the provision of an improved film extrusion apparatus which is simple in construction and use, easy to fabricate and provides for increased productivity.

These and other objects and advantages of the present invention are accomplished in accordance with the present invention by an extrusion apparatus having a pair of oppositely disposed, spaced elongated blades which together define an extrusion orifice of generally uniform width, with at least one of such blades having exposed terminal corner portions which may be flexed to vary the width of the extrusion orifice along the ends thereof. Except as hereafter described in detail, the extrusion apparatus of the present invention is essentially the same as that described in my U.S. Pat. No. 2,923,971 and thus the disclosure of such patent is incorporated herein by reference. Further, for the sake of clarity, simplicity and brevity, only one end of the extrusion apparatus of the present invention is illustrated in the accompanying drawing and is hereafter described in detail, it being understood that the construction, function and mode of operation of the opposite end of such apparatus is essentially the same as that which is described.

In the apparatus of the present invention, adjacent exposed edges along the lengths of the oppositely disposed blades define an elongated extrusion orifice which is of generally uniform width. The blades are each formed with planar end walls, with an end wall of one of such blades cooperating with an exposed surface extending between opposite end walls of such blade to define a corner. Formed in this blade corner is a slot which is open only along the adjacent end wall and exposed surface of such blade, and which is spaced from the extrusion orifice, as to permit that portion of such blade which is between the slot and the extrusion orifice to be flexed. Included in the extrusion apparatus of this invention are means for selectively deflecting the flexible portion of the one blade relative to the remainder thereof to thereby vary the width of the extrusion orifice at the end thereof.

More specifically, the blades employed in this apparatus include adjacent, opposing flat surfaces, with the exposed edges of these flat surfaces together defining the elongated extrusion orifice. The flexible portion of the one blade is actually a blade corner portion and is defined by the one end wall and the exposed and flat surfaces of such blade.

Flexibility of the corner portion of the one blade is essential, yet the degree of flexibility is rather limited so that deflection of the exposed edge along such corner portion can be confined and controlled as to provide the very end portion of the extrusion orifice with a desired contour. More specifically, during deflection of the flexible corner portion of the one blade toward the other of the pair of blades, that portion of the blade exposed edge extending along this flexible corner portion is contoured into a rather abrupt curvature, with the corner defined by such exposed edge and the adjacent edges of the blade end wall experiencing the greatest movement.

The essential flexural characteristics of the corner portion of the one blade are dependent upon a number of considerations, such as the location, size and shape of slot and the material from which such blade is formed, at least certain of which can, of course, be varied.

Desirably, this slot is spaced from the exposed edge of the one blade such distance as to preserve the blade structural integrity and the linearity of its exposed edge; that is, with this exposed edge being capable of assuming and maintaining a linear or straight condition in the absence of a deflecting force applied to the flexible corner portion thereof.

A slot which is generally planar appears to be the most appropriate from the standpoint of ease of fabrication. Preferably, the plane of such slot is parallel to or diverges slightly relative to the exposed edge of this blade to provide for the above described abrupt edge curvature during blade deflection. Forming the slot with a diagonal base extending between the blade exposed surface and its adjacent end wall, and with the opening thereof along the blade end wall being at least equal to and preferably longer than that which is along its exposed surface, both assist in achievement of the desired curvature of the exposed edge of such blade during its deflection.

Deflection of the flexible corner portion of the one blade can be achieved by a variety of means, as for example, by a screw threaded through a rigid bracket fixed to such blade and adapted to react against such flexible corner. The deflecting force exerted by such screw should be applied as close as possible to the blade corner as defined by its exposed edge and the adjacent edges of the end wall. Generally, such blades are formed with projecting lips, the exposed edges of which define the extrusion orifice, and thus the axis of such adjusting screw should be substantially perpendicular to the exposed surface of the lip on the one blade which is to be deflected.

The slotted blade of the apparatus of the present invention may also be provided with a kerf which extends through the end portion of such blade at a location adjacent to the slot and remote from the extrusion orifice. Such kerf is similar to that provided in the apparatus described in my U.S. Pat. No. 2,712,155 but is preferably planar and generally parallel to the adjacent slot. An adjusting screw is threaded into this blade from its side opposite the extrusion orifice for deflecting that portion of the blade which is on one side of the kerf, and which includes the flexible corner portion, relative to the remainder thereof. This adjusting screw is located as close as is structurally possible to the adjacent end wall of the blade, with its axis substantially perpendicular to the plane of the kerf to afford the application of a maximum and controlled deflecting force.

The extrusion apparatus of the present invention is adapted for use in making films from coagulable solutions, such as films of regenerated cellulose, cellulose esters and ethers, gelatin and casein, or in the manufacture of films from molten thermoplastic polymeric materials, as for example, polyethylene, polypropylene, nylon, polyesters and the like.

For a greater understanding of this invention, reference is made to the following detailed description and drawing in which FIG. 1 is a bottom view of a portion of the extrusion apparatus of the present invention;

FIG. 2 is a vertical section taken transversely through the apparatus shown in FIG. 1 along the line II—II;

FIG. 3 is a side view of the apparatus shown in FIG. 1, with elements thereof removed;

FIG. 4 is a fragmentary view of the apparatus as seen along a plane intermediate the bottom and side views of FIGS. 1 and 3; and FIG. 5 is a diagrammatic perspective view of the apparatus shown in FIG. 1, with a portion thereof removed.

As heretofore mentioned, the extrusion apparatus of the present invention is similar to that disclosed in my U.S. Pat. No. 2,923,971, with the accompanying drawing illustrating only those elements which are necessary for a clear understanding of the present invention. Thus, shown in the drawing are elongated metallic blades 11 and 13 having opposing faces 15 and 17 of which the exposed edges 19 and 21 define an extrusion orifice 23. The blade 13 is longer than the blade 11 and generally is firmly fixed, as by bolts 25, to a supporting structure or casing 27. On the other hand, the blade 11 is adjustable relative to the blade 13 by suitable means, not shown, to vary the width of the orifice 23, with hold-down bolts 29 retaining the blade 11 against the casing 27.

Both of the blades 11 and 13 are generally of like configuration, with the blade 11, for example, having planar end walls 31, a rear wall 33, a flat exposed surface 35 and an included exposed surface 37, the latter of which defines a lip 39.

As in conventional film extrusion apparatus, end blocks 41 seal the ends of the extrusion orifice 23. Adjustable screws 43 and 45 are threaded through a bracket 47, which is fixed at 49 to the structure 27, for retaining the individual end blocks 41 snugly against the blades 11 and 13. A plate 51 is generally positioned between the end blocks 41 and the screw 43 to secure more uniform pressure application. As in conventional extrusion apparatus, the above described end blocks 41 and their retaining means permit the blade 11 to be adjusted and deflected without leakage of the film-forming material.

As best seen in FIG. 5, the blade corner 53, as defined by the end wall 31 and the inclined exposed surface 37, is formed with a slot 55 having a diagonal or inclined base 57. The presence of this slot permits the blade corner portion, indicated generally at 59, which is between such slot 55 and the orifice 23 to be flexed toward the opposing blades 13. Deflection of the blade corner portion 59 is effected by an adjustable screw 61 which is threaded through rigid angle bracket 65 fixed to the blade 11 by bolts 67. As shown in FIG. 2, the axis of the screw 61 is substantially perpendicular to the plane of the inclined exposed surface 37, and as seen in FIGS. 1, 4 and 5 its reacting end engages with the blade 11 as close as is structurally possible to the blade free corner 69.

As noted above, the bracket 65 must be rigid so that an advancement of the screw 61 serves to deflect the free corner 69 of the blade 11 instead of simply bending the bracket 65. Further, it is desirable to have the reacting end of the screw 61 rotatably seated within a cap, such as shown at 70, so as to minimize any tendency for such end of the screw to drift or "walk" along the inclined blade surface 37 during its advancement. This cap 70 is pressed flat against the blade surface 37, with its opening being such as to permit free rotary movement of the reacting end of the screw 61 during binding between such screw and cap.

Upon advancement of the screw 61, the blade corner portion 59 will be deflected toward the blade 13 with the free corner 69 experiencing maximum movement and the exposed edge 19 assuming a rather abrupt curvature. The length of the slot opening along the blade end wall 31 is preferably longer than that which opens along the blade exposed wall 37 so as to confine the curvature of the exposed edge 19 to a limited length at its very end.

Desirably, the blade 11 is also formed with a kerf 71 which extends through such blade. This kerf 71 extends tangentially from a hole 73 and is generally planar and parallel to the slot 55. An adjustable screw 75 is threaded into the blade 11 from its rear wall 33, with the axis of such screw being substantially perpendicular to the plane of the kerf 71.

Upon advancement of the screw 75, the portion of the blade 11 between the kerf 71 and the blade face 15 will flex generally about an axis of the hole 73. This blade deflection is distinguished from that effected by advancement of the screw 61 in which only the blade free corner 69, and limited areas adjacent thereto, are flexed.

As explained in my U.S. Pat. No. 2,712,155 in the manufacture of regenerated cellulose films, viscose is extruded through an extrusion orifice having a width of about ten times the final or dry thickness of the film and, in an effort to minimize thickness variations and particularly edge bead formations, rather demanding orifice dimensions must be satisfied. The extrusion apparatus of the present invention has been employed in such particular application has provided remarkable results.

More particularly, a conventional extrusion apparatus was modified by the installation of a blade as shown at 11, having a planar slot 55 and kerf 71. The plane of the slot 55 was spaced about ¼ inch from a parallel plane containing the blade exposed edge 19 and the length of such slot opening along the blade end wall 31 was about 1½ times the slot length opening along the exposed inclined surface 37.

Initially, attempts were made to minimize bead formation along the edges of the film in the conventional manner; that is, by adjusting the screw 75 to effect deflection of that portion of the blade 11 extending between the kerf 71 and the blade face 19. The best results achieved by this mode of adjustment are set forth at A in the table given below. Subsequently, the screw 61 was advanced in stages, with measurements of the resulting film being made to illustrate the effect provided by the deflection of the blade corner portion 59. The results achieved at each stage are also set forth at B and C in the following table.

It is to be understood that changes and variations may be made without departing from the spirit and scope of the invention as defined in the appended claims.

| STAGE | FILM THICKNESS (INCH) | | | |
|---|---|---|---|---|
| | AT EDGE BEAD | DISTANCE IN FROM EDGE (INCHES) | | |
| | | ½ | 1 | 1½ |
| A (INITIAL) | .00140 | .00070 | .00064 | .00060 |
| B | .00090 | .00070 | .00064 | .00062 |
| C | .00070 | .00070 | .00070 | .00068 |

I claim:

1. An extrusion apparatus for shaping a flowable film-forming material into a stream of desired cross-section, said apparatus including a pair of elongated, oppositely disposed blades each having generally planar end walls, means supporting said oppositely disposed blades in fixed, spaced apart relationship whereby adjacent, exposed edges of said oppositely disposed blades together define an elongated extrusion orifice of generally uniform width, a corner of one of said blades, as defined by an end wall and an exposed surface extending between the end walls of said one blade, having a slot therein, said slot being open only along such one end wall and such exposed surface of said one blade and located in spaced relationship with said extrusion orifice as to permit that portion of said one blade which is between said slot and said extrusion orifice to be flexed, and means located adjacent to said corner for selectively deflecting said flexible portion of said one blade relative to the remainder thereof to thereby vary the width of the extrusion orifice at the end thereof.

2. Apparatus as defined in claim 1 wherein said blades include adjacent, opposing flat surfaces, the exposed edges of which define said extrusion orifice, and wherein said flexible portion of said one blade constitutes a blade corner portion as defined by said one end wall and said exposed and flat surfaces.

3. Apparatus as defined by claim 2 wherein said slot is generally planar.

4. Apparatus as defined in claim 3 wherein the slot opening along said one end wall is of a length at least as long as that of the slot opening along said exposed surface.

5. Apparatus as defined in claim 2 wherein said deflecting means includes a bracket fixed to said one blade at a location removed from the flexible portion thereof and a screw which is adjustable relative to said bracket and adapted to react against said blade flexible corner portion adjacent to its free end.

6. Apparatus as defined in claim 3 wherein said exposed surface includes a planar surface which is inclined relative to the remainder of said exposed surface and which, together with said flat surface of said one blade, defines an elongated, projecting die lip, and wherein said deflecting means reacts against the free end of said flexible corner portion of said one blade along an axis substantially perpendicular to said inclined planar surface.

7. Apparatus as defined in claim 6 wherein opposite ends of said one blade are provided with like slots and deflecting means.

8. Apparatus as defined in claim 6 further including a relief kerf extending through an end portion of said one blade at a location adjacent and spaced relative to said slot and remote from said extrusion orifice, and means operatively associated with said one blade for flexing that segment of said one blade which is located on one side of said kerf, and contains said slot, with respect to the segment of such one blade which is disposed on the other side of such kerf.

9. Apparatus as defined in claim 8 wherein said kerf is planar and generally parallel to the plane of said slot and wherein said flexing means includes an adjustable screw having its axis disposed substantially perpendicular to the plane of said kerf.

10. Apparatus as described in claim 9 wherein the other of said blades extends beyond the ends of said one blade, and further including end blocks for sealing the ends of the extrusion orifice.

11. Apparatus as defined in claim 9 wherein opposite end portions of said one blade are provided with like slots, kerfs and deflecting and flexing means.

* * * * *

UNITED STATES PATENT AND TRADEMARK OFFICE
CERTIFICATE OF CORRECTION

PATENT NO. : 4,029,460
DATED : June 14, 1977
INVENTOR(S) : Seddon C. Nelson

It is certified that error appears in the above-identified patent and that said Letters Patent are hereby corrected as shown below:

Column 5, line 7, after "during" insert --its advancement and a very limited side movement to avoid--.

Signed and Sealed this

Twenty-fifth Day of July 1978

[SEAL]

Attest:

RUTH C. MASON
*Attesting Officer*

DONALD W. BANNER
*Commissioner of Patents and Trademarks*